United States Patent
Fukahori et al.

(10) Patent No.: US 11,587,734 B2
(45) Date of Patent: Feb. 21, 2023

(54) THIN-FILM DEVICE HAVING A CLOSE-CONTACT LAYER COVERING PART OF A WIRING ELECTRODE, AND METHOD OF MANUFACTURING THIN-FILM DEVICE

(71) Applicant: Murata Manufacturing Co., Ltd., Nagaokakyo (JP)

(72) Inventors: Souko Fukahori, Nagaokakyo (JP); Toshiyuki Nakaiso, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 124 days.

(21) Appl. No.: 16/227,193

(22) Filed: Dec. 20, 2018

(65) Prior Publication Data

US 2019/0122822 A1 Apr. 25, 2019

Related U.S. Application Data (63) Continuation of application No. PCT/JP2017/046315, filed on Dec. 25, 2017.

(30) Foreign Application Priority Data

Dec. 28, 2016 (JP) .............................. JP2016-254714

(51) Int. Cl.
 *H01G 4/228* (2006.01)
 *H01G 4/33* (2006.01)

(52) U.S. Cl.
 CPC ............... *H01G 4/228* (2013.01); *H01G 4/33* (2013.01)

(58) Field of Classification Search
 CPC ................................. H01G 4/228; H01G 4/33
 See application file for complete search history.

(56) References Cited

U.S. PATENT DOCUMENTS

| 6,498,714 B1 | 12/2002 | Fujisawa et al. |
| 6,656,828 B1 * | 12/2003 | Maitani ............. H01L 21/76843 438/613 |
| 2002/0017730 A1 | 2/2002 | Tahara et al. |
| 2007/0145449 A1 * | 6/2007 | Sato ..................... H05K 1/0231 257/295 |

(Continued)

FOREIGN PATENT DOCUMENTS

| JP | 2001110675 A | 4/2001 |
| JP | 2002057291 A | 2/2002 |

(Continued)

OTHER PUBLICATIONS

International Search Report issued in PCT/JP2017/046315, dated Mar. 20, 2018.

(Continued)

*Primary Examiner* — David M Sinclair
(74) *Attorney, Agent, or Firm* — ArentFox Schiff LLP (57) ABSTRACT

A thin-film device that includes a wiring electrode which contains copper. A terminal electrode is formed on a first region of the first main surface of the wiring electrode. A first close-contact layer made of a material different from copper and that has a shape covering, in a continuous manner, a second region of the first main surface of the wiring electrode, the second region being adjacent to the first region, and the side surface of the wiring electrode that is continuous with the second region.

9 Claims, 10 Drawing Sheets

(56) References Cited

U.S. PATENT DOCUMENTS

| | | | | |
|---|---|---|---|---|
| 2007/0241424 A1* | 10/2007 | Dalton | .................... | H01L 28/91 |
| | | | | 257/532 |
| 2008/0186654 A1* | 8/2008 | Takeshima | ............. | H01G 4/232 |
| | | | | 361/313 |
| 2009/0117671 A1* | 5/2009 | Nagai | .................... | H01L 28/55 |
| | | | | 438/3 |
| 2013/0194714 A1* | 8/2013 | Nakaiso | ............. | H01L 23/5252 |
| | | | | 361/301.2 |
| 2016/0351556 A1* | 12/2016 | Nakaiso | ............. | H01L 27/0805 |

FOREIGN PATENT DOCUMENTS

| | | | |
|---|---|---|---|
| JP | 2007081325 A | 3/2007 | |
| JP | 2014090077 A | 5/2014 | |
| JP | 2014167988 A | 9/2014 | |
| JP | 2016213254 A | 12/2016 | |
| WO | WO-2015151786 A1 * | 10/2015 | ......... H01L 27/0248 |

OTHER PUBLICATIONS

Written Opinion of the International Searching Authority issued in PCT/JP2017/046315, dated Mar. 20, 2018.

* cited by examiner

THIN-FILM DEVICE HAVING A CLOSE-CONTACT LAYER COVERING PART OF A WIRING ELECTRODE, AND METHOD OF MANUFACTURING THIN-FILM DEVICE

CROSS REFERENCE TO RELATED APPLICATIONS

The present application is a continuation of International application No. PCT/JP2017/046315, filed Dec. 25, 2017, which claims priority to Japanese Patent Application No. 2016-254714, filed Dec. 28, 2016, the entire contents of each of which are incorporated herein by reference.

FIELD OF THE INVENTION

The present invention relates to a thin-film device that includes a rewiring layer including a copper electrode.

BACKGROUND OF THE INVENTION

In the related art, various thin-film devices that use copper (Cu) electrodes in rewiring layers have been put to practical use. For example, in the thin-film device described in Patent Document 1, a rewiring layer is formed on the top surface of a capacitor, and copper wiring electrodes are used in the rewiring layer. In addition, in the thin-film device described in Patent Document 1, an insulating resin layer is formed in a region excluding portions of the wiring electrodes, and solder bumps are formed on portions that are not covered with the insulating resin layer.

Patent Document 1: Japanese Unexamined Patent Application Publication No. 2007-81325

SUMMARY OF THE INVENTION

However, in the thin-film device described in Patent Document 1, the degree of contact between the insulating resin layer and the wiring electrode is small, and the insulating resin layer allows moisture to pass therethrough. Thus, for example, when halogen contained in the flux of the solder bumps collects at the wiring electrode, which is a positive (+) electrode, a compound is formed together with copper. In other words, there is a case where oxidation (corrosion) of the copper occurs. As a result, there is a possibility that the electric resistance of the wiring electrode will increase and a function of the thin-film device will deteriorate. In addition, when the thin-film device is viewed from a mounting surface of the thin-film device, the appearance of the thin-film device is not favorable because the copper of the wiring electrode, which is a positive (+) electrode, has discolored.

It is an object of the present invention to suppress deterioration of a thin-film device when viewed from a mounting surface of the thin-film device without deteriorating a function of the thin-film device.

A thin-film device according to an aspect of the present invention includes a functional element that is formed in a substrate or on the substrate, a rewiring layer that is formed on the substrate, a terminal electrode that is formed on a surface of the rewiring layer that is farthest from the substrate, and a first close-contact layer. The rewiring layer includes a wiring electrode that connects the functional element and the terminal electrode to each other and that has a flat film-like shape. The wiring electrode has a first main surface, which is parallel to the surface of the rewiring layer, and a second main surface, which is opposite to the first main surface, and the wiring electrode is made of a material containing copper. The terminal electrode is directly or indirectly connected to a first region of the first main surface of the wiring electrode. The first close-contact layer is made of a material that becomes passivated. The first close-contact layer is in direct contact with the wiring electrode and has a shape covering, in a continuous manner, a second region of the first main surface of the wiring electrode, the second region being adjacent to the first region, and an end portion of the wiring electrode that is continuous with the second region.

In this configuration, the first main surface and a side surface of the wiring electrode are covered with the first close-contact layer in a continuous manner. Thus, halogen ions generated from the flux of a solder bump do not reach the wiring electrode, and formation of a compound from the halogen ions and the copper of the wiring electrode is suppressed.

It is preferable that the thin-film device according to an aspect of the present invention further include an insulating resin layer that covers the first close-contact layer and a side surface of the terminal electrode.

With this configuration, a rewiring layer that maintains its insulating property can be easily formed at low cost, and the wiring electrode and the first close-contact layer are protected against moisture from the outside, so that reliability is improved.

In the thin-film device according to an aspect of the present invention, it is preferable that the insulating resin layer cover an outer edge portion of a surface of the terminal electrode.

With this configuration, the degree of contact between the insulating resin layer and the terminal electrode is increased, entry of the flux through an interface between the insulating resin layer and the terminal electrode is suppressed.

It is preferable that the thin-film device according to an aspect of the present invention further include a second close-contact layer that is formed on the second main surface of the wiring electrode and that is made of a material that becomes passivated, and it is preferable that the second close-contact layer be continuous with the first close-contact layer.

In this configuration, the first main surface, the side surface, and the second main surface of the wiring electrode are covered with the insulating resin layer, and thus, corrosion of the wiring electrode is suppressed with higher certainty. In addition, as a result of corrosion of the wiring electrode being suppressed, increase in the electric resistance can be suppressed.

In the thin-film device according to an aspect of the present invention, it is preferable that the first close-contact layer and the second close-contact layer be each made of at least one type of material selected from titanium (Ti), chrome (Cr), nickel (Ni), and aluminum (Al) or at least one type of material selected from compounds containing any of titanium (Ti), chrome (Cr), nickel (Ni), and aluminum (Al).

Each of the above materials forms a passivation film, that is, the oxygen diffusion rate in an oxide is low, and thus, the material has characteristics of forming a thin, dense oxide film on a surface so as to protect the original metal with the oxide film formed on the surface and being less likely to be corroded. Therefore, by using these materials, an effect of protecting the wiring electrode is improved.

In the thin-film device according to an aspect of the present invention, it is preferable that the functional element be a thin-film capacitor that includes a dielectric layer and capacitor electrodes, and it is further preferable that the wiring electrode be electrically connected to one of the capacitor electrodes that is a positive electrode.

With this configuration, a portion of the wiring electrode in which corrosion is likely to occur is protected with higher certainty. In addition, as a result of corrosion of the wiring electrode being suppressed, increase in the electric resistance can be suppressed.

In the thin-film device according to an aspect of the present invention, it is preferable that the end portion of the wiring electrode face another wiring electrode that is electrically connected to one of the capacitor electrodes that is a negative electrode.

With this configuration, a portion of the wiring electrode in which corrosion is more likely to occur is protected with higher certainty. In addition, as a result of corrosion of the wiring electrode being suppressed, increase in the electric resistance can be suppressed.

It is preferable that the dielectric layer of the thin-film device be a sintered compact.

With this configuration, the capacitance of the thin-film device can be increased.

It is preferable that the wiring electrode of the thin-film device be made of a material that has a conductivity higher than a conductivity of each of the capacitor electrodes.

With this configuration, transmission loss can be reduced.

It is preferable that a thickness of the wiring electrode of the thin-film device be larger than a thickness of each of the capacitor electrodes.

With this configuration, the conductor resistance of the wiring electrode can be reduced.

A method of manufacturing a thin-film device according to the present invention includes forming a rewiring layer that includes a wiring electrode onto a top surface of a substrate that includes a functional element and forming a terminal electrode onto a first region of a surface of the rewiring layer farthest from the substrate. In one aspect of the present invention, the forming of the rewiring layer includes forming a second close-contact layer made of a material that becomes passivated, forming a wiring electrode that is made of a material containing copper onto a surface of the second close-contact layer so as to form a wiring-electrode-formation region in which the wiring electrode is formed on the surface of the second close-contact layer and an exposed region in which a wiring electrode is not formed on the surface of the second close-contact layer, forming a first close-contact layer made of a material that becomes passivated such that the first close-contact layer is continuous with a second region of the wiring electrode adjacent to the first region, an end portion of the wiring electrode, and the exposed region of the second close-contact layer, and removing a portion of the first close-contact layer and a portion of the second close-contact layer that are not in contact with the wiring electrode.

In this manufacturing method, an unwanted portion of the first close-contact layer and an unwanted portion of the second close-contact layer are removed at a time, and thus, the manufacturing method is further simplified.

According to the present invention, deterioration in the appearance of a thin-film device when viewed from a mounting surface of the thin-film device can be suppressed without deteriorating a function of the thin-film device.

DETAILED DESCRIPTION OF THE PREFERRED EMBODIMENTS

First Embodiment

Figure 1:
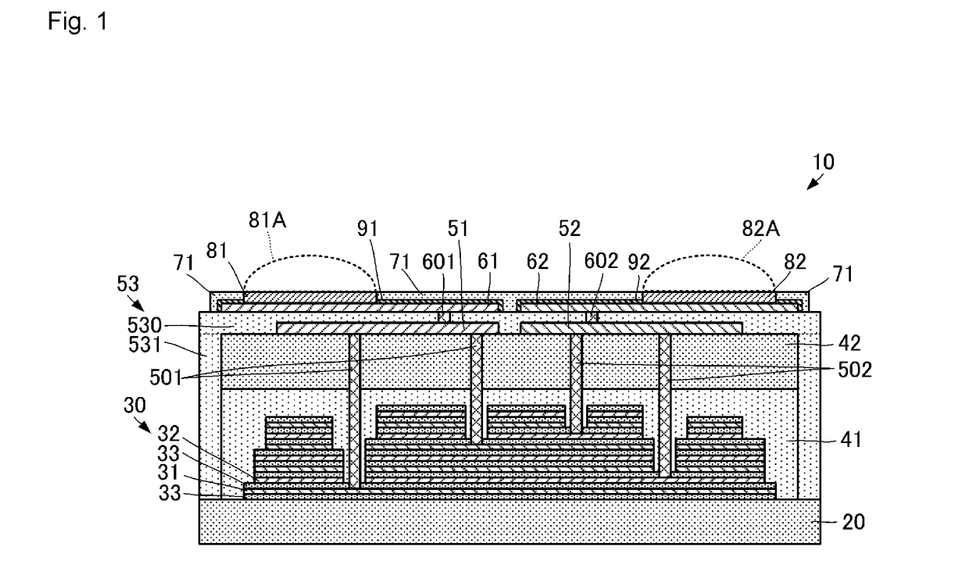
FIG. 1 is a sectional side view illustrating a schematic configuration of a thin-film device according to a first embodiment of the present invention.
Figure 2:
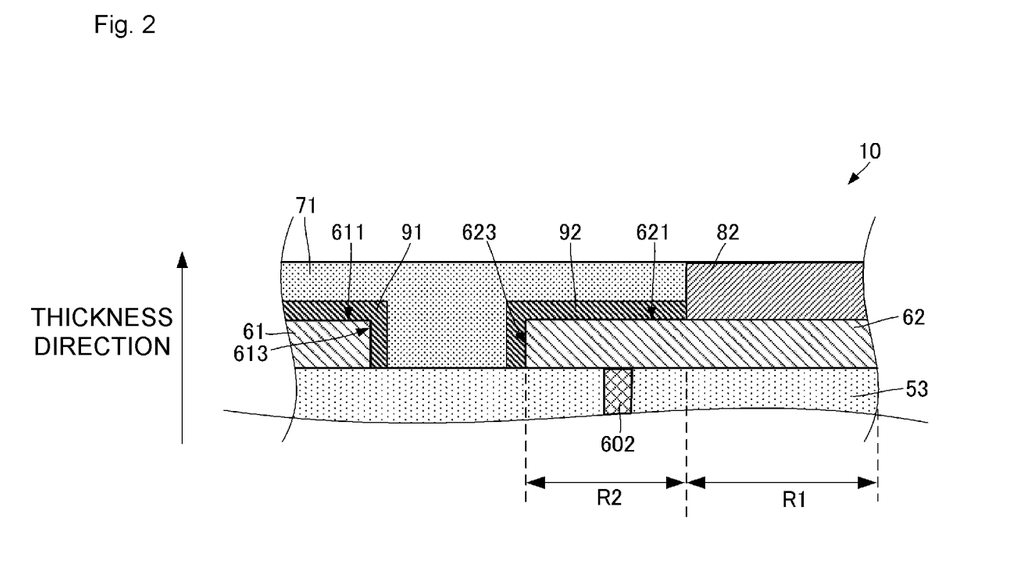
FIG. 2 is an enlarged sectional side view illustrating the schematic configuration of the thin-film device according to the first embodiment of the present invention.
Figure 3:
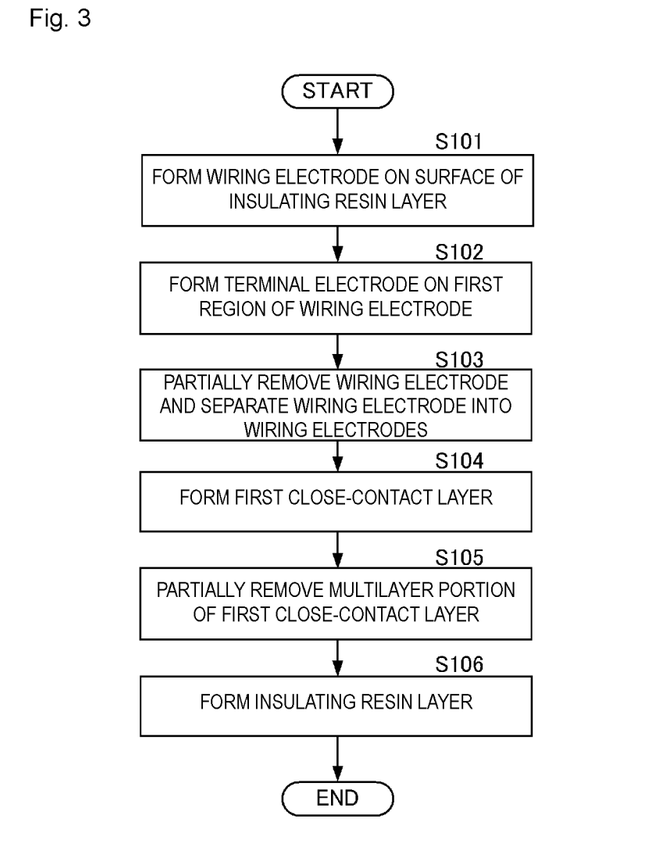
FIG. 3 is a flowchart illustrating a process of manufacturing the thin-film device according to the first embodiment of the present invention.
Figure 4A:
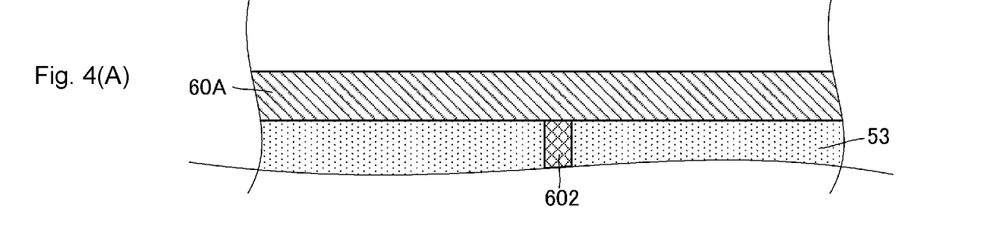
FIGS. 4(A), 4(B), and 4(C) are diagrams illustrating the configuration in each step of the first half process in the manufacturing flow for the thin-film device illustrated in FIG. 3.
Figure 4B:
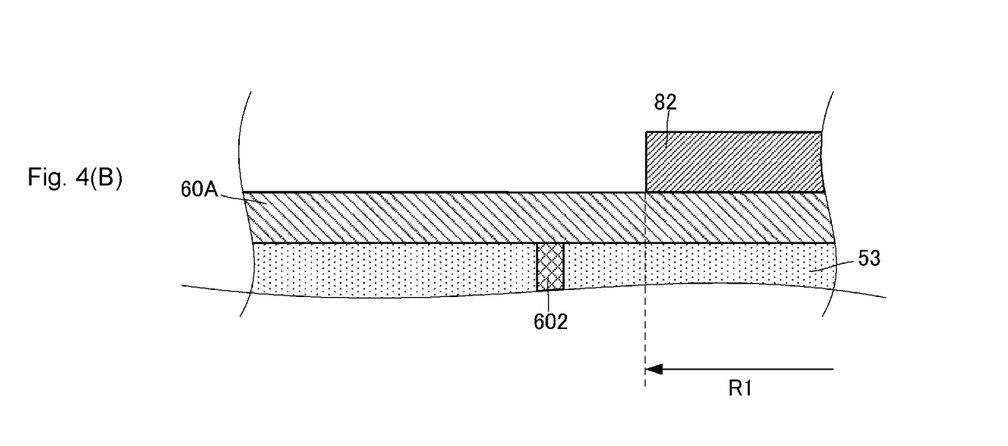
Figure 4C:
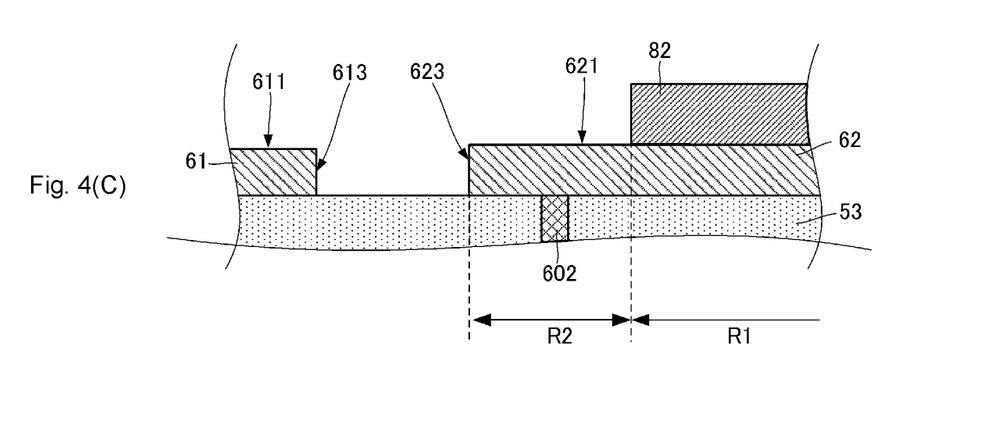
Figure 5A:
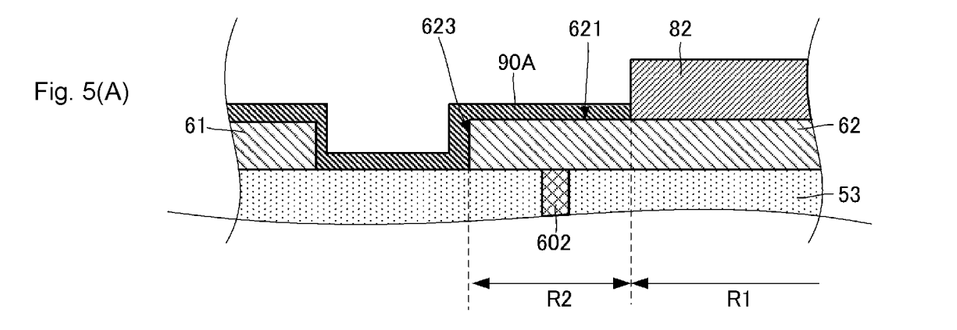
FIGS. 5(A), 5(B), and 5(C) are diagrams illustrating the configuration in each step of the latter half process in the manufacturing flow for the thin-film device illustrated in FIG. 3.
Figure 5B:
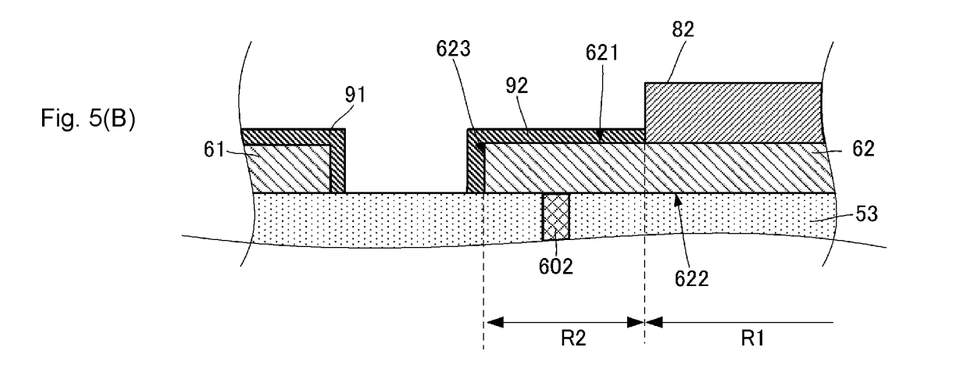
Figure 5C:
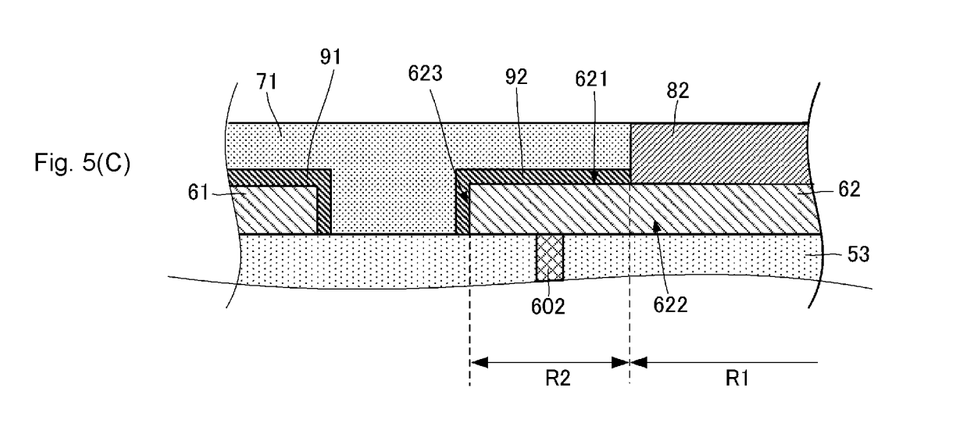

A thin-film device according to a first embodiment of the present invention will be described with reference to the drawings. FIG. 1 is a sectional side view illustrating a schematic configuration of the thin-film device according to the first embodiment of the present invention. FIG. 2 is an enlarged sectional side view illustrating the schematic configuration of the thin-film device according to the first embodiment of the present invention. FIG. 3 is a flowchart illustrating a process of manufacturing the thin-film device according to the first embodiment of the present invention. FIGS. 4(A), 4(B), and 4(C) are diagrams illustrating the configuration in each step of the first half process in the manufacturing flow for the thin-film device illustrated in FIG. 3. FIGS. 5(A), 5(B), and 5(C) are diagrams illustrating the configuration in each step of the latter half process in the manufacturing flow for the thin-film device illustrated in FIG. 3.

As illustrated in FIG. 1, a thin-film device 10 includes a base substrate 20, a capacitor layer 30, insulator layers 41 and 42, wiring electrodes 51, 52, 61, and 62, an insulating resin layer 53, an insulating resin layer 71, terminal electrodes 81 and 82, and first close-contact layers 91 and 92.

The thin-film device 10 is a so-called thin-film capacitor device and is obtained by forming a capacitor layer and the above-mentioned components on the base substrate 20 through a thin-film process. The capacitor corresponds to a "functional element" according to the present description.

The base substrate 20 is a semiconductor substrate or an insulating substrate. The base substrate 20 has a rectangular shape when viewed in plan view. The capacitor layer 30 is formed on a surface of the base substrate 20. The capacitor layer 30 includes a plurality of first capacitor electrodes 31, a plurality of second capacitor electrodes 32, and a plurality of dielectric layers 33. More specifically, the capacitor layer 30 has the following configuration. One of the dielectric layers 33 that functions as a close-contact layer is formed on the surface of the base substrate 20. One of the first capacitor electrodes 31, another one of the dielectric layers 33, and one of the second capacitor electrodes 32 are sequentially formed on a surface of the close-contact layer. The first capacitor electrode 31 and the second capacitor electrode 32 face each other with the dielectric layer 33 interposed therebetween. In addition, another one of the dielectric layers 33 is formed on a surface of the second capacitor electrode 32. By repeatedly forming this layer structure, the plurality of first capacitor electrodes 31 and the plurality of second capacitor electrodes 32 are arranged in a lamination direction such that each of the first capacitor electrodes 31 and a corresponding one of the second capacitor electrodes 32 face each other with one of the dielectric layers 33 interposed therebetween.

Note that each of the dielectric layers 33 is formed of a sintered compact made of, for example, BST. As a result, the capacitance of the dielectric layer 33 can be increased. In a process of sintering the dielectric layers 33, it is preferable that the first capacitor electrodes 31 and the second capacitor electrodes be made of a material (e.g., Pt) having favorable oxidation resistance.

The insulator layer 41 has a shape covering substantially the entire front surface of the base substrate 20. The insulator layer 41 covers a front surface and a side surface of the capacitor layer 30. The insulator layer 41 functions as a moisture-resistant protective film. As a result, all the surfaces of the capacitor layer 30 are covered with the insulator layer 41 and the base substrate 20, and the capacitor layer 30 is protected against an external environment such as humidity. The insulator layer 42 is formed on a surface of the insulator layer 41 (a surface of the insulator layer 41 that is opposite to the surface of the insulator layer 41 that is in contact with the base substrate 20). The functional element is not limited to the capacitor and may be formed on the base substrate 20 or may be formed in the base substrate 20.

The wiring electrodes 51 and 52 each have a flat film-like shape and are formed on a surface of the insulator layer 42. Even though only one wiring electrode 51 and one wiring electrode 52 are shown in the figures, typically a plurality of wiring electrodes 51 and a plurality of wiring electrodes 52 are provided. The wiring electrodes 51 are connected to the first capacitor electrodes 31 via a plurality of contact holes 501 that are formed in the insulator layers 41 and 42. The wiring electrodes 52 are connected to the second capacitor electrodes 32 via a plurality of contact holes 502 that are formed in the insulator layers 41 and 42.

The insulating resin layer 53 includes a front-surface portion 530 and a side-surface portion 531. The front-surface portion 530 is formed on the surface of the insulator layer 42, and the side-surface portion 531 is formed on a side surface of the insulator layer 42 and a side surface of the insulator layer 41. The front-surface portion 530 of the insulating resin layer 53 covers the wiring electrodes 51 and 52 and substantially corresponds to a rewiring layer according to the present description. In other words, the rewiring layer is formed above the base substrate 20.

As illustrated in FIG. 1 and FIG. 2, the wiring electrode 61 has a flat film-like shape and is disposed on the front surface of the insulating resin layer 53. The wiring electrode 61 is connected to the wiring electrodes 51 via a contact hole 601 that is formed in the insulating resin layer 53.

The wiring electrode 62 has a flat film-like shape and is disposed on the front surface of the insulating resin layer 53. The wiring electrode 62 is connected to the wiring electrodes 52 via a contact hole 602 that is formed in the insulating resin layer 53.

A portion including the wiring electrodes 51 and 52, a portion of the insulating resin layer 53 that is located on the front surface side of the insulating resin layer 53, the wiring electrodes 61 and 62, and the contact holes 601 and 602 corresponds to the "rewiring layer" according to the present description. In other words, the rewiring layer is disposed on the side of the top surface of the functional element.

The terminal electrode 81 is formed on a first main surface (front surface) 611 of the wiring electrode 61.

The first close-contact layer 91 is formed, in a continuous manner, on a region of the first main surface (front surface) 611 of the wiring electrode 61 excluding the region on which the terminal electrode 81 is formed and on a side surface 613 of the wiring electrode 61 that is continuous with the first main surface 611. In other words, a portion of the first close-contact layer 91 on the first main surface 611 and a portion of the first close-contact layer 91 on the side surface 613 are continuous with each other.

The terminal electrode 82 is formed on a first main surface (front surface) 621 of the wiring electrode 62.

The first close-contact layer 92 is formed, in a continuous manner, on a second region R2 of the first main surface (front surface) 621 of the wiring electrode 62 excluding a region (first region R1) on which the terminal electrode 82 is formed and on a side surface 623 of the wiring electrode 62 that is continuous with the second region R2. The side surface 623 of the wiring electrode 62 that faces the wiring electrode 61 corresponds to an "end portion of a wiring electrode" according to the present description. In other words, a portion of the first close-contact layer 92 on the first main surface 621 and a portion of the first close-contact layer 92 on the side surface 623 are connected to each other. Note that the end portion of the wiring electrode may have a planar shape such as that of the side surface 623 or may have a shape with irregularities.

As illustrated in FIG. 1, a solder bump 81A is formed on the terminal electrode 81, and a solder bump 82A is formed on the terminal electrode 82.

The insulating resin layer 71 is formed so as to cover the exposed surfaces of the first close-contact layers 91 and 92.

By employing such a configuration, the wiring electrode 61 is covered with the terminal electrode 81 and the first close-contact layer 91 and is not in contact with the insulating resin layer 71 and the solder bump 81A. In addition, the wiring electrode 62 is covered with the terminal electrode 82 and the first close-contact layer 92 and is not in contact with the insulating resin layer 71 and the solder bump 82A.

The wiring electrodes 51, 52, 61, and 62 are preferably made of copper (Cu), or contain copper (Cu) as a main component thereof. The first close-contact layers 91 and 92 are preferably made of titanium (Ti). Note that the first close-contact layers 91 and 92 may be made of any material as long as the material becomes passivated and are preferably made of at least one type of material selected from titanium (Ti), chrome (Cr), nickel (Ni), and aluminum (Al), or made of at least one type of material selected from compounds containing any of the above materials.

In such a configuration, in the case where the wiring electrode 62 and the terminal electrode 82 are positive (+) electrodes and where the wiring electrode 61 and the terminal electrode 81 are negative (−) electrodes, a halogen contained in, for example, the flux of the solder bump 82A may sometimes be ionized as a result of reacting with moisture on a surface, then pass through the insulating resin layer 71 together with steam, and collect at the second region R2 of the wiring electrode 62. However, as described above, since the second region R2 of the first main surface 621 of the wiring electrode 62 and the side surface 623 of the wiring electrode 62 are covered with the first close-contact layer 92, the copper of the wiring electrode 62 and the halogen do not combine with each other. Note that the wiring electrode 62, which is a positive electrode, is connected to a positive electrode of the capacitor layer 30.

Therefore, oxidation (corrosion) of the wiring electrode 62 is suppressed. As a result, discoloration in the second region R2 of the first main surface 621 of the wiring electrode 62 can be suppressed, and deterioration in the appearance can be suppressed. Note that the material of the first close-contact layer 92 forms a passivation film, that is, the oxygen diffusion rate in an oxide is low, and thus, the material has characteristics of forming a thin, dense oxide film on a surface so as to protect the original metal with the oxide film formed on the surface and being less likely to be corroded. As described above, since the wiring electrode 62 is covered with the first close-contact layer 92 that is less likely to be corroded, an effect of protecting the wiring electrode 62 is improved. In addition, oxidation of the copper of the wiring electrode 62 is suppressed, and thus, for example, the electric resistance of the wiring electrode 62 is less likely to increase, and deterioration in a function of the thin-film device 10 can be suppressed.

In contrast, as described above, in a configuration of the related art in which the first close-contact layer 92 is not formed, copper of a wiring electrode and a halogen combine with each other, and discoloration occurs in the second region R2 of the wiring electrode. Note that halogen ions have a characteristic of collecting at a positive (+) electrode. Thus, the first close-contact layer 92 may at least be formed on the wiring electrode 62, which is a positive (+) electrode.

In addition, in the case where the wiring electrode 62, which is a positive (+) electrode, and the wiring electrode 61, which is a negative (−) electrode, are arranged so as to be close to each other, the intensity of an electric field generated between these wiring electrodes is high, and a halogen is likely to be generated in the wiring electrode 62, which is a positive (+) electrode. However, by employing the above-described configuration, the copper and the halogen do not combine with each other, and thus, corrosion is suppressed. Since oxidation of the copper of the wiring electrode 62 is suppressed, for example, the electric resistance of the wiring electrode 62 is less likely to increase, and deterioration in the function of the thin-film device 10 can be suppressed.

Note that the wiring electrode 62 can be formed after formation of a sintered compact, and it is only necessary that a portion of the wiring electrode 62 that is in contact with the insulating resin layer 71 have oxidation resistance. Thus, instead of using a material such as Pt, which has favorable oxidation resistance, a material (e.g., Cu or the like) having a conductor resistance lower than that of each of the first capacitor electrodes 31 and each of the second capacitor electrodes 32 can be used for the wiring electrode 62, and the wiring electrode 62 can be covered with the close-contact layer.

It is preferable that the first capacitor electrodes 31 and the second capacitor electrodes 32, which are inner-layer electrodes, be thinly formed in order to reduce internal stress. In contrast, there is less need to reduce stress for the wiring electrode 62, and thus, the wiring electrode 62 can be formed so as to be thicker than each of the first capacitor electrodes 31 and each of the second capacitor electrodes 32. Consequently, the conductor resistance can be reduced. In an end portion (a side surface) of the wiring electrode 62, the area of a portion that is in contact with the first close-contact layer 92 increases as a result of the wiring electrode 62 being thickly formed. Thus, it is preferable that the end portion (the side surface) of the wiring electrode 62 also be covered with the first close-contact layer 92.

The thin-film device 10 having such a configuration is manufactured by a method illustrated in FIG. 3, FIG. 4(A), FIG. 4(B), FIG. 4(C), FIG. 5(A), FIG. 5(B), and FIG. 5(C). Note that, here, only a process of manufacturing the peripheral portion of the wiring electrode 62 will be described. The rest of processes can be performed by a known manufacturing method, and descriptions thereof will be omitted.

First, as illustrated in FIG. 3 and FIG. 4(A), a wiring electrode 60A is formed on a surface of the insulating resin layer 53 in which the contact hole 602 has been formed (a surface of the insulating resin layer 53 that is opposite to the surface of the insulating resin layer 53 that is in contact with the insulator layer 41) (S101). The wiring electrode 60A is made of copper (Cu).

Next, as illustrated in FIG. 3 and FIG. 4(B), the terminal electrode 82 is formed on the first region R1 of the first main surface (front surface) of the wiring electrode 60A (S102). The terminal electrode 82 is formed of, for example, a nickel plating layer and a gold plating layer.

Next, as illustrated in FIG. 3 and FIG. 4(C), the wiring electrode 61 and the wiring electrode 62 that are spaced apart from each other are formed by partially removing the wiring electrode 60A (S103). The wiring electrode 60A is removed by selective etching. Through this step, the first main surface (front surface) 611 and the side surface 613 of the wiring electrode 61 are formed, and similarly, the first main surface (front surface) 621 and the side surface 623 of the wiring electrode 62 are formed. In the first main surface (front surface) 621 of the wiring electrode 62, a region that is adjacent to the first region R1 is the second region R2.

Next, as illustrated in FIG. 3 and FIG. 5(A), the first close-contact layer 90A is formed so as to cover the exposed surfaces of the wiring electrodes 61 and 62 (S104).

By forming the first close-contact layer 90A, the first main surface 621 (corresponding to the second region R2) of the wiring electrode 62 excluding a portion (the first region R1) on which the terminal electrode 82 is formed, the second main surface 622 of the wiring electrode 62, and the side surface 623 of the wiring electrode 62 are covered with the first close-contact layer 90A. Similar to the wiring electrode 62, the wiring electrode 61 is covered with the first close-contact layer 90A.

Next, as illustrated in FIG. 3 and FIG. 5(B), the first close-contact layer 90A that is formed between the wiring electrodes 61 and 62 is removed (S105). As a result, the first close-contact layer 91 covering the wiring electrode 61 is formed.

Next, as illustrated in FIG. 3 and FIG. 5(C), the insulating resin layer 71 is formed on the first close-contact layers 91 and 92 and the exposed surface of the insulating resin layer 53 (S106).

By using such a manufacturing method, the thin-film device 10 having the above-described configuration can be manufactured.

Second Embodiment

Figure 6:
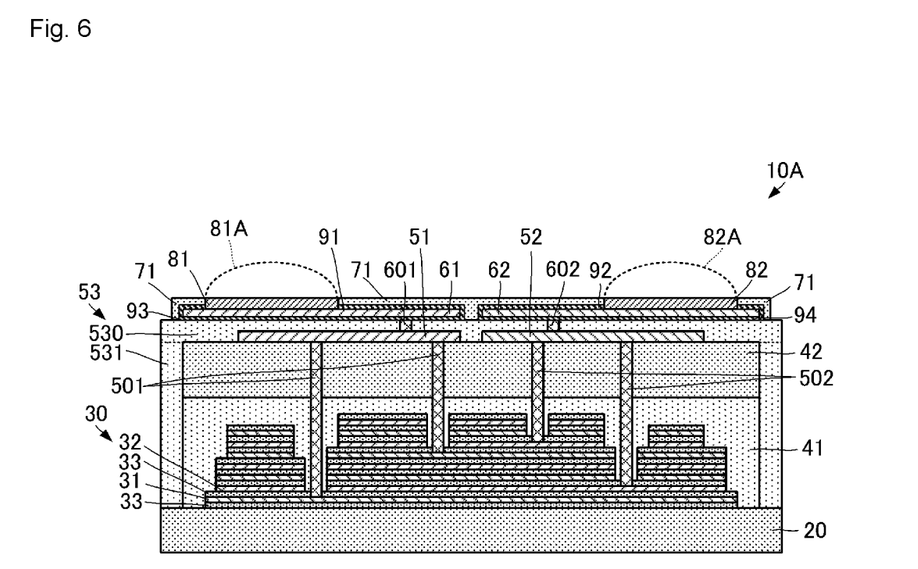
FIG. 6 is a sectional side view illustrating a schematic configuration of a thin-film device according to a second embodiment of the present invention.
Figure 7:
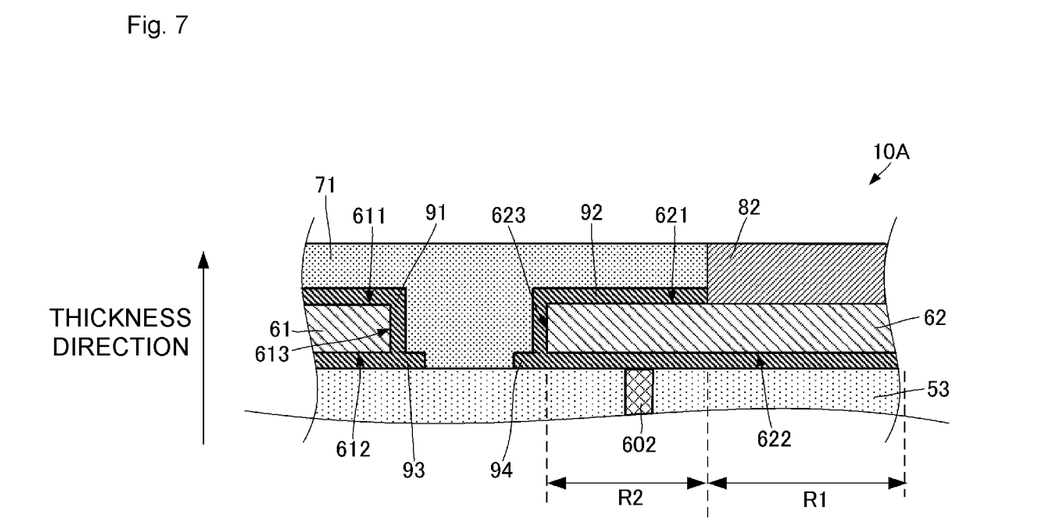
FIG. 7 is an enlarged sectional side view illustrating the schematic configuration of the thin-film device according to the second embodiment of the present invention.
Figure 8:
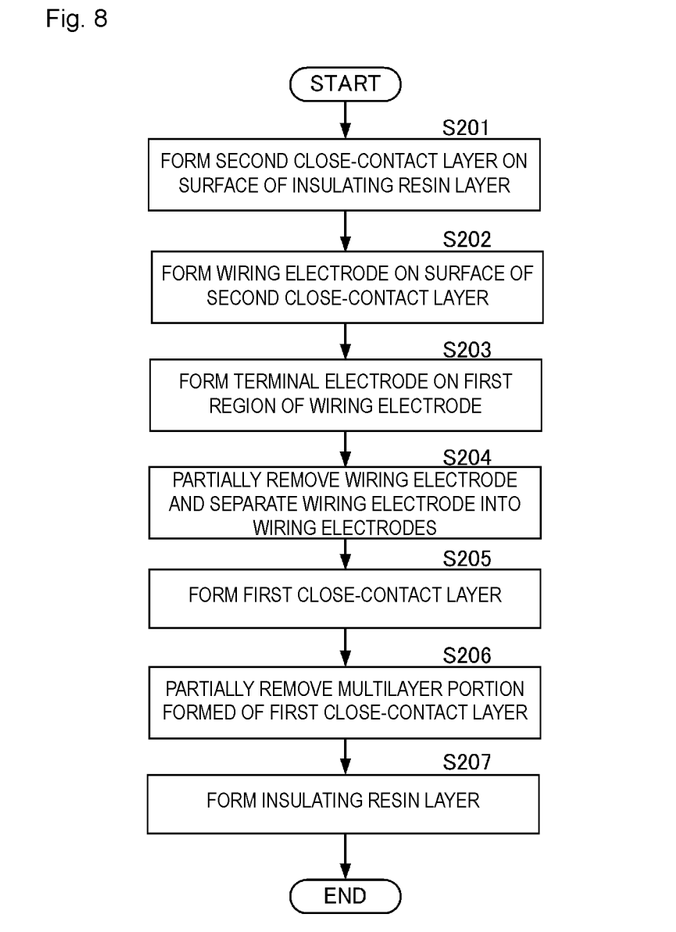
FIG. 8 is a flowchart illustrating a process of manufacturing the thin-film device according to the second embodiment of the present invention.
Figures 9A, 9B:
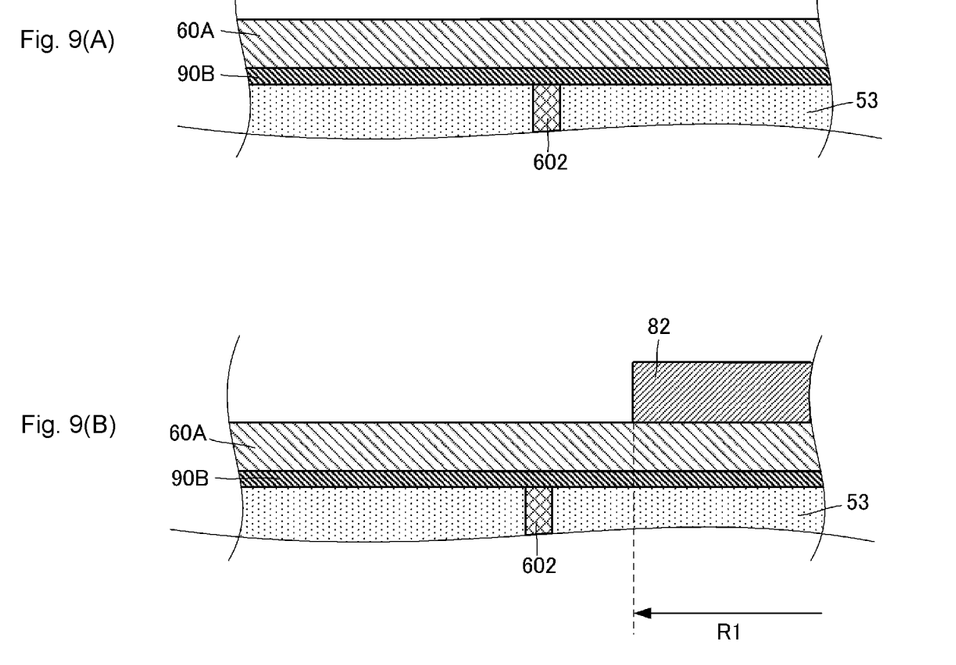
FIGS. 9(A), 9(B), and 9(C) are diagrams illustrating the configuration in each step of the first half process in the manufacturing flow for the thin-film device illustrated in FIG. 8.
Figure 9C:
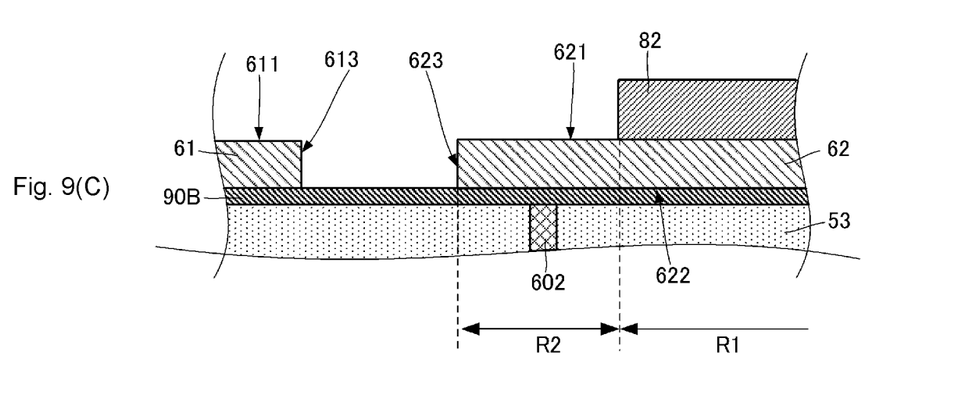
Figure 10A:
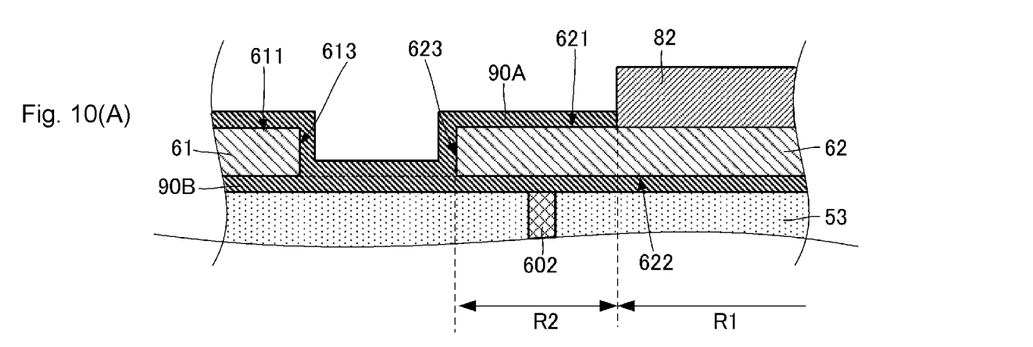
FIGS. 10(A), 10(B), and 10(C) are diagrams illustrating the configuration in each step of the latter half process in the manufacturing flow for the thin-film device illustrated in FIG. 8.
Figure 10B:
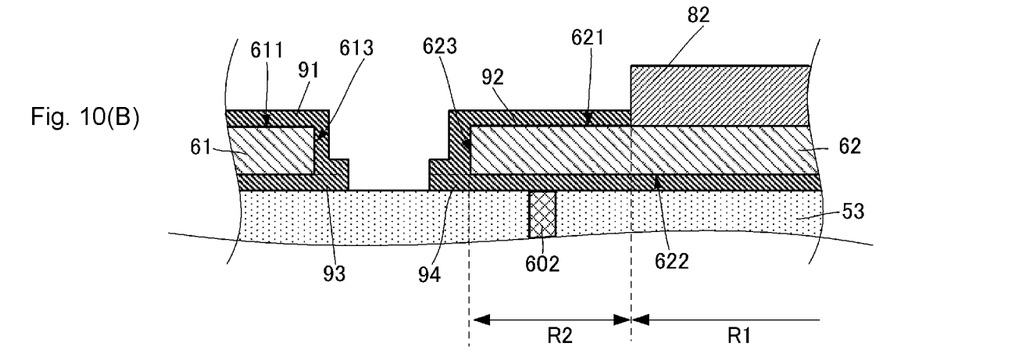
Figure 10C:
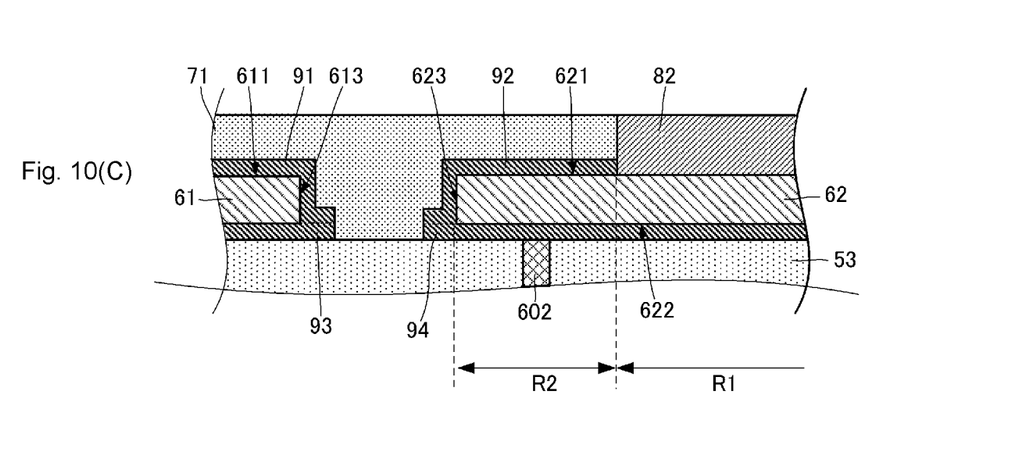

A thin-film device according to a second embodiment of the present invention will be described with reference to the drawings. FIG. 6 is a sectional side view illustrating a schematic configuration of the thin-film device according to the second embodiment of the present invention. FIG. 7 is an enlarged sectional side view illustrating the schematic configuration of the thin-film device according to the second embodiment of the present invention. FIG. 8 is a flowchart illustrating a process of manufacturing the thin-film device according to the second embodiment of the present invention. FIGS. 9(A), 9(B), and 9(C) are diagrams illustrating the configuration in each step of the first half process in the manufacturing flow for the thin-film device illustrated in FIG. 8. FIGS. 10(A), 10(B), and 10(C) are diagrams illustrating the configuration in each step of the latter half process in the manufacturing flow for the thin-film device illustrated in FIG. 8.

As illustrated in FIG. 6, the difference between a thin-film device 10A according to the present embodiment and the thin-film device 10 according to the first embodiment is that the thin-film device 10A further includes second close-contact layers 93 and 94. The rest of the configuration of the thin-film device 10A is similar to that of the thin-film device 10, and descriptions of similar components will be omitted.

As illustrated in FIG. 6 and FIG. 7, the wiring electrode 61 has a flat film-like shape and is disposed on the surface of the insulating resin layer 53 with the second close-contact layer 93 interposed therebetween. In other words, the second close-contact layer 93 is formed on the surface of the insulating resin layer 53 and is in contact with a second main surface (rear surface) 612 of the wiring electrode 61. The wiring electrode 61 (the second close-contact layer 93) is connected to the wiring electrodes 51 via the contact hole 601, which is formed in the insulating resin layer 53.

The wiring electrode 62 has a flat film-like shape and is disposed on the surface of the insulating resin layer 53 with the second close-contact layer 94 interposed therebetween. In other words, the second close-contact layer 94 is formed on the surface of the insulating resin layer 53 and is in contact with a second main surface (rear surface) 622 of the wiring electrode 62. The wiring electrode 62 (the second close-contact layer 94) is connected to the wiring electrodes 52 via the contact hole 602, which is formed in the insulating resin layer 53.

A portion of the first close-contact layer 91 on the first main surface 611 and a portion of the first close-contact layer 91 on the side surface 613 are continuous with each other. In addition, the first close-contact layer 91 is continuous with the second close-contact layer 93.

A portion of the first close-contact layer 92 on the first main surface 621 and a portion of the first close-contact layer 92 on the side surface 623 are continuous with each other. In addition, the first close-contact layer 92 is continuous with the second close-contact layer 94. The first close-contact layer 92 is in direct contact with the wiring electrode 62 and also is in direct contact with the second close-contact layer 94.

As illustrated in FIG. 6, the solder bump 81A is formed on the terminal electrode 81, and the solder bump 82A is formed on the terminal electrode 82.

The insulating resin layer 71 is formed so as to cover the first close-contact layers 91 and 92 and the exposed surfaces of the second close-contact layers 93 and 94.

By employing such a configuration, the wiring electrode 61 is covered with the terminal electrode 81, the first close-contact layer 91, and the second close-contact layer 93 and is not in contact with the insulating resin layer 71 and the solder bump 81A. The wiring electrode 62 is covered with the terminal electrode 82, the first close-contact layer 92, and the second close-contact layer 94 and is not in contact with the insulating resin layer 71 and the solder bump 82A.

Similar to the first embodiment, the wiring electrodes 51, 52, 61, and 62 are made of copper (Cu). Note that the wiring electrodes 51, 52, 61, and 62 may contain copper (Cu) as a main component. The first close-contact layers 91 and 92 and the second close-contact layers 93 and 94 are made of titanium (Ti). Note that the first close-contact layers 91 and 92 and the second close-contact layers 93 and 94 may be made of any material as long as the material becomes passivated and are preferably made of at least one type of material selected from titanium (Ti), chrome (Cr), nickel (Ni), and aluminum (Al) or at least one type of material selected from compounds containing any of the above materials.

In addition, in the case where the wiring electrode 62, which is a positive (+) electrode, and the wiring electrode 61, which is a negative (−) electrode, are arranged so as to be close to each other, the intensity of an electric field generated between these wiring electrodes is high, and a halogen is likely to be generated in the wiring electrode 62, which is a positive (+) electrode. However, by employing the above-described configuration, copper and a halogen do not combine with each other, and thus, corrosion is suppressed.

In the present embodiment, the first close-contact layer 92 and also the second close-contact layer 94 are provided, so that the wiring electrode 62 is in contact with neither the insulating resin layer 71 nor the insulating resin layer 53, and thus, oxidation (corrosion) of the wiring electrode 62 can be suppressed with higher certainty. In addition, since oxidation of the copper of the wiring electrode 62 is suppressed, for example, the electric resistance of the wiring electrode 62 is less likely to increase, and deterioration in a function of the thin-film device 10A can be suppressed.

Furthermore, since the second close-contact layers 93 and 94 are formed, compared with the first embodiment, oxidation (corrosion) toward a bottom surface is further suppressed, and the degree of contact between each of the wiring electrodes 61 and 62 and the insulating resin layer 53 is further improved.

The thin-film device 10A having such a configuration is manufactured by a method illustrated in FIG. 8, FIG. 9(A), FIG. 9(B), FIG. 9(C), FIG. 10(A), FIG. 10(B), and FIG. 10(C). Note that, here, only a process of manufacturing the peripheral portion of the wiring electrode 62 will be described. The rest of processes can be performed by a known manufacturing method, and descriptions thereof will be omitted.

First, as illustrated in FIG. 8 and FIG. 9(A), a second close-contact layer 90B is formed on a surface of the insulating resin layer 53 in which the contact hole 602 has been formed (the surface of the insulating resin layer 53 that is opposite to the surface of the insulating resin layer 53 that is in contact with the insulator layer 41) (S201). The second close-contact layer 90B is made of, for example, titanium (Ti). Then, the wiring electrode 60A is formed on a surface of the second close-contact layer 90B (S202). The wiring electrode 60A is made of copper (Cu).

Next, as illustrated in FIG. 8 and FIG. 9(B), the terminal electrode 82 is formed on the first region R1 of the first main surface (front surface) of the wiring electrode 60A (S203). The terminal electrode 82 is formed of, for example, a nickel plating layer and a gold plating layer.

Next, as illustrated in FIG. 8 and FIG. 9(C), the wiring electrode 61 and the wiring electrode 62 that are spaced apart from each other are formed by partially removing the wiring electrode 60A (S204). In other words, on the surface of the second close-contact layer, regions on which the wiring electrodes are formed and a region in which the second close-contact layer is exposed are formed. The wiring electrode 60A is removed by selective etching, and a solvent that removes the wiring electrode 60A and that does not remove the second close-contact layer 90B may be used. Through this step, the first main surface (front surface) 611, the second main surface (rear surface) 612, and the side surface 613 of the wiring electrode 61 are formed, and similarly, the first main surface (front surface) 621, the second main surface (rear surface) 622, and the side surface 623 of the wiring electrode 62 are formed. In the first main surface (front surface) 621 of the wiring electrode 62, a region that is adjacent to the first region R1 is the second region R2.

Next, as illustrated in FIG. 8 and FIG. 10(A), the first close-contact layer 90A is formed so as to cover the exposed surfaces of the wiring electrodes 61 and 62 and the exposed surface of the second close-contact layer 90B (S205).

By forming the first close-contact layer 90A and the second close-contact layer 90B, the first main surface 621 (corresponding to the second region R2) of the wiring electrode 62 excluding a portion (the first region R1) on which the terminal electrode 82 is formed, the second main surface 622 of the wiring electrode 62, and the side surface 623 of the wiring electrode 62 are covered with the first close-contact layer 90A and the second close-contact layer 90B. Similar to the wiring electrode 62, the wiring electrode 61 is covered with the first close-contact layer 90A and the second close-contact layer 90B.

A portion between the wiring electrode 61 and the wiring electrode 62 is a multilayer film formed of the first close-contact layer 90A and the second close-contact layer 90B.

Next, as illustrated in FIG. 8 and FIG. 10(B), the first close-contact layer 90A and the second close-contact layer 90B formed between the wiring electrodes 61 and 62 are removed (S206). As a result, the first close-contact layer 91 and the second close-contact layer 93, which cover the wiring electrode 61, and the first close-contact layer 92 and the second close-contact layer 94, which cover the wiring electrode 62, are formed.

Next, as illustrated in FIG. 8 and FIG. 10(C), the insulating resin layer 71 is formed on the first close-contact layers 91 and 92, the second close-contact layers 93 and 94, and the exposed surface of the insulating resin layer 53 (S207).

By using such a manufacturing method, the thin-film device 10A having the above-described configuration can be manufactured. In addition, by making the first close-contact layer 90A and the second close-contact layer 90B out of the same material, the first close-contact layers 91 and 92 and the second close-contact layers 93 and 94 can be formed in a single process, so that the manufacturing process can be simplified.

Third Embodiment

Figure 11:
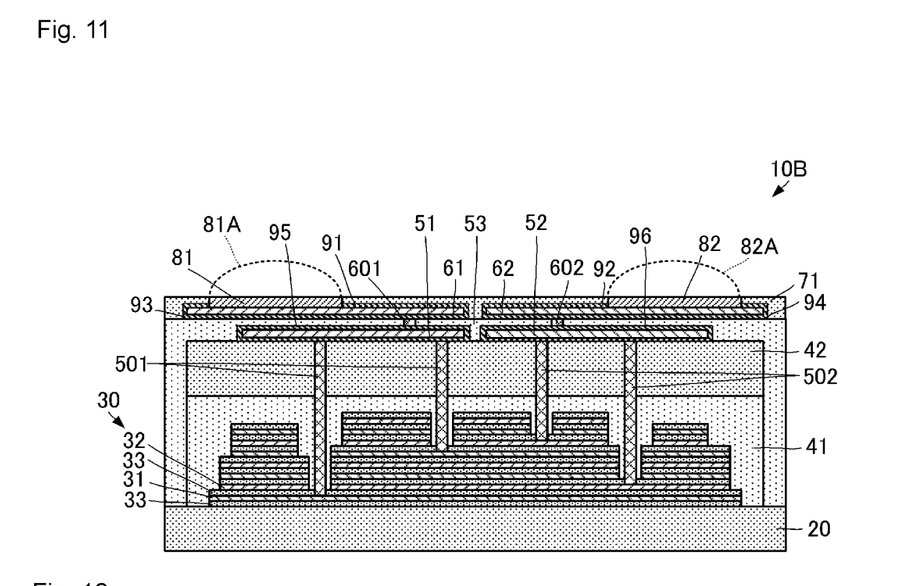
FIG. 11 is a sectional side view of a thin-film device according to a third embodiment of the present invention.

A thin-film device according to a third embodiment of the present invention will now be described. FIG. 11 is a sectional side view of the thin-film device according to the third embodiment of the present invention.

As illustrated in FIG. 11, the difference between a thin-film device 10B according to the present embodiment and the thin-film device 10 according to the first embodiment is that the thin-film device 10B further includes the second close-contact layers 93 and 94, a third close-contact layer 95, and a fourth close-contact layer 96. The rest of the configuration of the thin-film device 10B is similar to that of the thin-film device 10, and descriptions of similar components will be omitted.

The third close-contact layer 95 covers the wiring electrodes 51. The fourth close-contact layer 96 covers the wiring electrodes 52.

In the case where the wiring electrode 62 is a positive (+) wiring electrode, a situation may be assumed in which halogen ions generated from the flux of the solder bump 81A pass not only through the insulating resin layer 71 but also through the insulating resin layer 53. However, the wiring electrodes 52 is covered with the fourth close-contact layer 96, so that the wiring electrodes 52 is not in contact with the insulating resin layer 53. Thus, the copper of the wiring electrodes 52 and the halogen do not combine with each other, and corrosion of the wiring electrodes 52 is suppressed.

In addition, since oxidation of the copper of the wiring electrodes 52 is suppressed, for example, the electric resistance of the wiring electrodes 52 is less likely to increase, and deterioration in a function of the thin-film device 10B can be suppressed. Similarly, since oxidation of the copper of the wiring electrode 62 is suppressed, for example, the electric resistance of the wiring electrode 62 is less likely to increase, and deterioration in a function of the thin-film device 10B can be suppressed.

With this configuration, the thin-film device 10B provides advantageous effects similar to those of the thin-film device 10 according to the first embodiment, and corrosion of a wiring electrode that is disposed deeper in the rewiring layer can also be suppressed.

Fourth Embodiment

Figure 12:
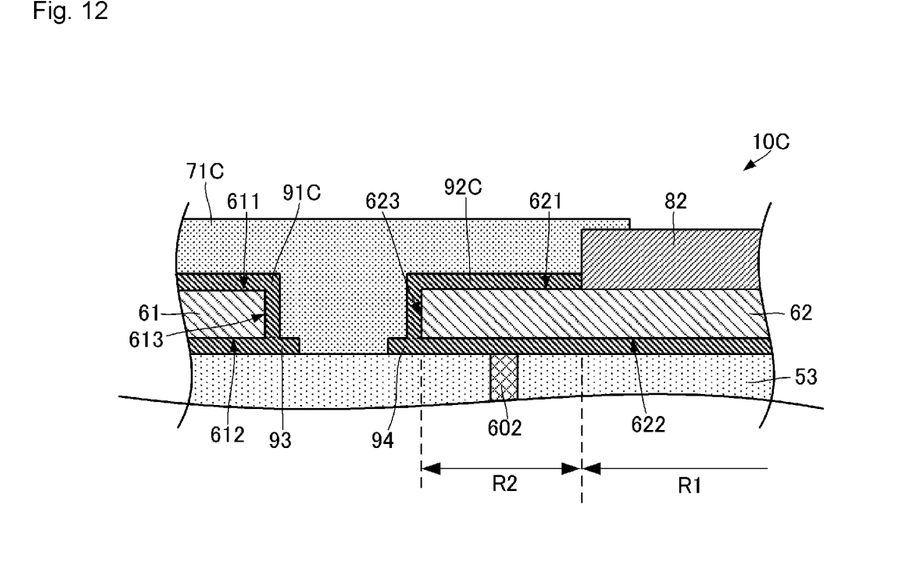
FIG. 12 is an enlarged sectional side view illustrating a schematic configuration of a thin-film device according to a fourth embodiment of the present invention.

A thin-film device according to a fourth embodiment of the present invention will now be described. FIG. 12 is an enlarged sectional side view illustrating a schematic configuration of the thin-film device according to the fourth embodiment of the present invention.

As illustrated in FIG. 12, the differences between a thin-film device 10C according to the present embodiment and the thin-film device 10 according to the first embodiment are that the thin-film device 10C further includes the second close-contact layers 93 and 94 and that an insulating resin layer 71C has a shape different from that of the insulating resin layer 71. The rest of the configuration of the thin-film device 10C is similar to that of the thin-film device 10, and descriptions of similar components will be omitted.

The insulating resin layer 71C covers a portion (a surface-outer-edge portion) of a surface of the terminal electrode 82 (the surface of the terminal electrode 82 that is opposite to the surface of the terminal electrode 82 that is in contact with the wiring electrode 62). Note that, although not illustrated, the insulating resin layer 71C also covers a portion (a surface-outer-edge portion) of a surface of the terminal electrode 81.

As a result of the portion (the surface-outer-edge portion) of the surface of the terminal electrode 82 being covered with the insulating resin layer 71C, a corner of the surface of the terminal electrode 82 is covered with the insulating resin layer 71C, and the degree of contact between the insulating resin layer 71C and the terminal electrode 82 is improved. This improves reliability. In addition, as a result of the corner of the surface of the terminal electrode 82 being covered with the insulating resin layer 71C, entry of water and a halogen through an interface between the insulating resin layer 71C and the terminal electrode 82 is suppressed, and the above-mentioned corrosion can be further suppressed.

In order to simply obtain the advantageous effects of the present application, the insulating resin layer 71C can be omitted. However, the insulating resin layer 71C can protect the wiring electrodes 61 and 62, the first close-contact layers 91 and 92, and the like against an external environment, so that the reliability is improved.

Figure 13:
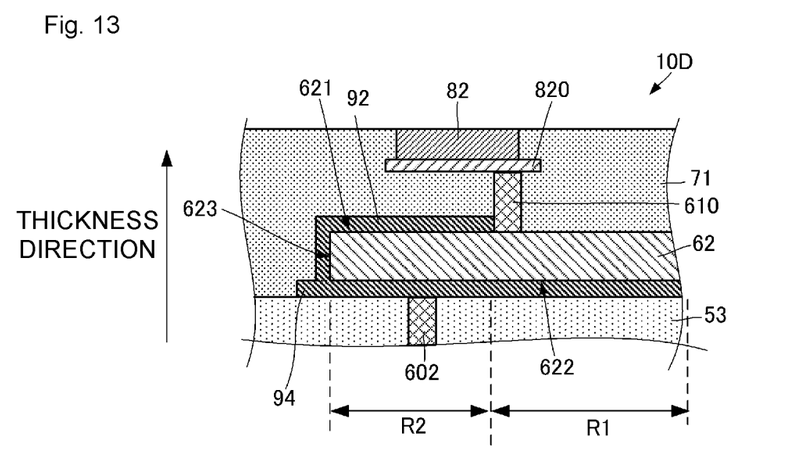
FIG. 13 is an enlarged sectional side view illustrating a derivative configuration of the thin-film device according to the embodiment of the present invention.

In addition, in the above description, although an aspect has been described in which the terminal electrode 82 is directly connected to the wiring electrode 62, the terminal electrode 82 may be indirectly connected to the wiring electrode 62 as illustrated in FIG. 13. FIG. 13 is an enlarged sectional side view illustrating a derivative configuration of the thin-film device according to the embodiment of the present invention. As illustrated in FIG. 13, the terminal electrode 82 of a thin-film device 10D is connected to the wiring electrode 62 by an auxiliary electrode 820 and a contact hole 610. The auxiliary electrode 820 is made of a material that makes the auxiliary electrode 820 less likely to be corroded than the wiring electrode 62 is. Even with such a configuration, the above-mentioned advantageous effects can be obtained.

REFERENCE SIGNS LIST 10, 10A, 10B, 10C, 10D thin-film device
20 base substrate
30 capacitor layer
31 first capacitor electrode
32 second capacitor electrode
33 dielectric layer
41, 42 insulator layer
51, 52 wiring electrode
53 insulating resin layer
60A, 61, 62 wiring electrode
71, 71C insulating resin layer
81, 82 terminal electrode
81A, 82A solder bump
90A, 91, 92 first close-contact layer
90B, 93, 94 second close-contact layer
95 third close-contact layer
96 fourth close-contact layer
501, 502, 601, 602, 610 contact hole
530 front-surface portion
531 side-surface portion
611, 621 first main surface
612, 622 second main surface
613, 623 side surface
820 auxiliary electrode
R1 first region
R2 second region

The invention claimed is:

1. A device comprising:
a substrate;
a functional element in or on the substrate;
a wiring electrode electrically connected to the functional element, the wiring electrode having a flat film shape, a first main surface, a second main surface opposite to the first main surface, and made of a material containing copper;
a terminal electrode directly or indirectly connected to a first region of the first main surface of the wiring electrode;
a first close-contact layer made of a material that becomes passivated and is in direct contact with and continuously covers a second region of the first main surface of the wiring electrode and an end portion of the wiring electrode that is continuous with the second region, the second region being adjacent to the first region, and the first close-contact layer does not cover the first region of the first main surface of the wiring electrode to which the terminal electrode is directly or indirectly connected; and
a second close-contact layer on the second main surface of the wiring electrode and made of a material that becomes passivated, the second close-contact layer is continuous with the first close-contact layer and extends beyond the end portion of the wiring electrode that is continuous with the second region.

2. The device according to claim 1, further comprising an insulating resin layer that covers the first close-contact layer and a side surface of the terminal electrode.

3. The device according to claim 2, wherein the insulating resin layer covers an outer edge portion of a surface of the terminal electrode.

4. The device according to claim 1, wherein the first close-contact layer and the second close-contact layer are each made of at least one type of material selected from titanium, chrome, nickel, and aluminum or at least one type of material selected from compounds containing any of titanium, chrome, nickel, and aluminum.

5. The device according to claim 1,
wherein the functional element is a capacitor that includes a dielectric layer and capacitor electrodes, and
wherein the wiring electrode is electrically connected to one of the capacitor electrodes that is a positive electrode.

6. The device according to claim 5, wherein the wiring electrode is a first wiring electrode, and the thin-film device further comprises a second wiring electrode that is electrically connected to one of the capacitor electrodes that is a negative electrode, and the end portion of the first wiring electrode faces the second wiring electrode.

7. The device according to claim 5, wherein the dielectric layer is a sintered compact.

8. The device according to claim 5, wherein the wiring electrode is made of a material that has a conductivity higher than a conductivity of each of the capacitor electrodes.

9. The device according to claim 5, wherein a thickness of the wiring electrode is larger than a thickness of each of the capacitor electrodes.

* * * * *